March 10, 1925.

H. F. KNECHT ET AL

FRICTION FACING

Filed April 30, 1924

1,528,929

ALFRED F. CARPENTER
HOWARD F. KNECHT
INVENTORS

BY Frank R. Higley
ATTORNEY

Patented Mar. 10, 1925.

1,528,929

UNITED STATES PATENT OFFICE.

HOWARD F. KNECHT AND ALFRED F. CARPENTER, OF CLEVELAND, OHIO.

FRICTION FACING.

Application filed April 30, 1924. Serial No. 710,029.

*To all whom it may concern:*

Be it known that we, HOWARD F. KNECHT and ALFRED F. CARPENTER, citizens of the United States, and residing at Cleveland, in the county of Cuyahoga and State of Ohio, have invented new and useful Improvements in Friction Facings, of which the following is a specification.

This invention relates to a friction facing for friction surfaces such as are commonly employed in clutches, transmissions, brakes, etc., and in particular where such devices operate in a bath or spray of oil such as is common practice in the planetary types of automobile transmission and the transmission type of automobile brake.

According to the present practice a friction facing in the form of a lining consisting of a strip of friction fabric is secured to the inner face of a flexible brake band which is adapted to be tightened about a revolving drum thereby applying a desired degree of friction so as to gently check the speed of the drum or hold it against rotation. Such braking arrangement is commonly housed within a suitable casing containing enough oil to normally cover the lower part of the revolving mechanism, which when in motion so agitates the oil that for practical purposes all parts of the mechanism are surrounded by an oil spray. Lubrication of the friction surfaces when braking must be obtained from either residual oil in the brake band lining of friction fabric, or in oil which each successive portion of the revolving circumference of the drum obtains during that part of its cycle which carries it beneath the level of the oil in the casing. But in order that the lining may possess the requisite tensile strength, wearing quality, heat and oil resistance, etc., it is expedient that the fabric be pre-treated by impregnation with a filling element and also by being subjected to a high compression. Obviously the result of each of these treatments, whose object is to increase the density, is to decrease porosity. Moreover when the brake is applied with the most force, and lubrication is most needed, there is the least opportunity for oil to reach the friction surfaces from an outside source because they are then in the closest engagement.

For these reasons as well as others the oil within the reservoir is not able to function at the friction surfaces in a satisfactory manner especially when the brake must be applied with great force or for long intervals, and the result is that the friction surface of the brake lining soon becomes glazed and hardened, and due to excessive wear is very short lived.

The object of the present invention is to both lengthen the life of the friction material and insure a smooth engagement of the friction surfaces by providing adequate and thorough lubrication to them at all times.

In the embodiment of this invention illustrated:

Figure 1:
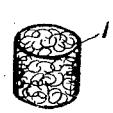
Figs. 1 and 2 are perspective views respectively of a lubricating plug, and a section of friction material perforated to receive the plug.
Figure 2:
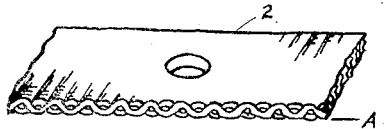
Figure 3:
Fig. 3 is a longitudinal sectional view of the part shown in Fig. 2 with the plug of Fig. 1 inserted therein.
Figure 4:
Fig. 4 is a view similar to that of Fig. 3 showing the friction material or lining secured to its backing.
Figure 6:
Fig. 6 is an optional form of lubricating plug, 1.
Figure 5:
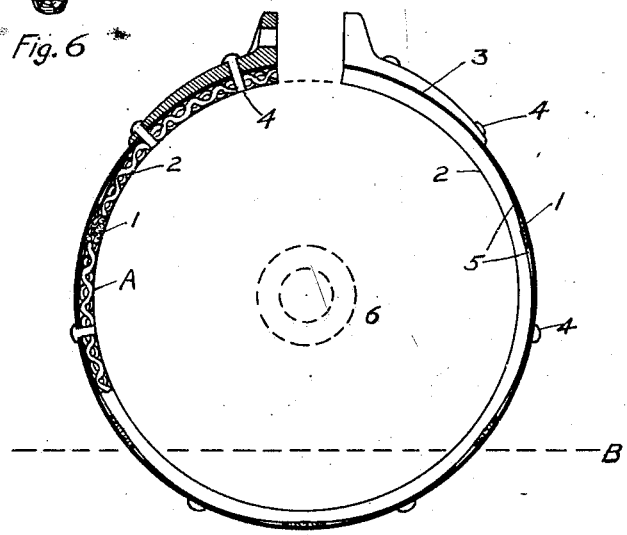
Fig. 5 is a view partly in section showing the lining as applied to a brake band as used in an ordinary planetary automobile transmission.

A preferred manner of constructing a sectional unit of our invention is as follows: A plug, 1, preferably cylindrical, as in Fig. 1, or of other shape, for example conical as in Fig. 6, of felt or other porous material is forced into a very tightly fitting correspondingly shaped perforation in the friction material, 2, in such manner that one end of the plug is flush with the friction surface A of the friction material, while the other end of the plug is left protruding from the opposite or inner side of the friction material—in much the same manner as an ordinary rivet would be secured. We have preferred to illustrate as an example an ordinary brake band lining such as is used in a planetary automobile transmission. In this case a number of such plugs are inserted at intervals along the center of the strip of friction material with which the brake band is lined. The lining is next secured to the brake band, 3, as shown in Fig. 4, in the ordinary manner by means of rivets, 4, passing through both the brake band, 3, and the brake lining, 2. It will be noticed that owing to the protrusion of the head of the plug, 1, beyond the rear surface of the lining, 2, a circular space, 5, is provided between the brake band and the lining. As shown in Fig. 5, an area of spacing, 5, between the brake band and lining is thus provided at each plug and extends to the lateral edges of the brake.

The manner of operation is as follows: As shown in Fig. 5 and described above, the lower part of the entire mechanism is submerged in oil to the approximate level of the line B, and rotation of the drum, 6, causes this oil to be so agitated that the whole surface of the mechanism is continually wet. When the brake is loose upon the drum sufficient oil is carried around by the face of the drum so that the friction surfaces are always wet. When the brake is applied, however, there is little or no opportunity for more oil to reach the friction surfaces which, because of the heat generated by the braking friction very quickly require additional oil for smooth action.

By reason of the plugs, 1, however, and their protruding heads, when the brake is first applied the pressure of the brake band upon the heads causes the plugs to give up their oil to the friction surface in the same manner as sponges being squeezed. And with continued application of the brake, owing to the spaces, 5, there is always opportunity for oil to reach the heads of the plugs. The plugs in turn being of porous material feed this oil to the friction surfaces by capillary attraction as wicks and this action continues as long as the brake is applied. It is not necessary that the spaces, 5, be as great as is shown in Figs. 4 and 5 which have been exaggerated in order to illustrate the principle of action.

While only one form of our invention is herein set forth in detail, we intend the invention, as disclosed in Figs. 1 to 4, to be comprehensive of application in conjunction with any friction material, to any shape of friction surface, such as plane, cylindrical or conical, and with any arrangement of the lubricating plugs in the friction material.

Having thus described and illustrated our invention, what we claim is:

1. A friction facing of the character described comprising a friction material and spacing projections extending beyond the back surface of said friction material.

2. A friction facing of the character described comprising a friction material and a plurality of porous spacing projections extending beyond the back surface of said friction material.

3. A friction facing of the character described comprising a friction material, a plurality of porous inserts therein, and spacing projections extending beyond the back surface of said friction material.

4. A friction facing of the character described comprising a friction material and a plurality of porous inserts therein protruding at the back of said friction material.

5. A friction facing of the character described comprising a friction material and a plurality of porous inserts therein flush with the friction surface of said friction material and protruding beyond the opposite surface of said friction material.

6. A friction facing of the character described comprising a friction material and a plurality of porous inserts therein adapted to absorb a lubricating fluid and to release said fluid under pressure from the back.

7. A friction facing of the character described comprising a friction material, spacing means upon the back surface of said friction material, and capillary connection between said back surface and the friction surface of said friction material.

8. A friction facing of the character described comprising a friction material, porous spacing means upon the back surface of said friction material, and capillary connection between the said back surface and the friction surface of said friction material.

9. A friction facing of the character described comprising a friction material, porous spacing means upon the back surface of said material, and extending through the said material to the friction surface of said material.

Signed by us, this 26th day of April, 1924.

HOWARD F. KNECHT.
ALFRED F. CARPENTER.